(12) United States Patent
Kim

(10) Patent No.: US 9,170,662 B2
(45) Date of Patent: Oct. 27, 2015

(54) STYLUS PEN AND ELECTRONIC DEVICE HAVING THE SAME

(71) Applicant: Samsung Electronics Co., Ltd., Gyeonggi-do (KR)

(72) Inventor: Jong-Hae Kim, Gwangmyeong-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 118 days.

(21) Appl. No.: 13/957,774

(22) Filed: Aug. 2, 2013

(65) Prior Publication Data
US 2014/0035887 A1    Feb. 6, 2014

(30) Foreign Application Priority Data

Aug. 2, 2012   (KR) .................. 10-2012-0084867

(51) Int. Cl.
| | |
|---|---|
| *G06F 3/033* | (2013.01) |
| *G06F 3/0354* | (2013.01) |
| *B43K 23/008* | (2006.01) |
| *G06F 1/16* | (2006.01) |

(52) U.S. Cl.
CPC .......... *G06F 3/03545* (2013.01); *B43K 23/008* (2013.01); *G06F 1/1626* (2013.01); *G06F 2200/1632* (2013.01)

(58) Field of Classification Search
None
See application file for complete search history.

(56) References Cited

U.S. PATENT DOCUMENTS

| | | | |
|---|---|---|---|
| 5,971,644 A | * 10/1999 | Kageyama et al. | ............. 401/99 |
| 6,341,911 B1 | 1/2002 | Shueh | |
| 2004/0145579 A1 | 7/2004 | Lilenfeld | |

FOREIGN PATENT DOCUMENTS

| | | |
|---|---|---|
| EP | 1 585 016 A1 | 10/2005 |
| KR | 10-2010-0082409 A | 7/2010 |
| KR | 10-2011-0016621 A | 2/2011 |

* cited by examiner

*Primary Examiner* — William Boddie
*Assistant Examiner* — Alecia D English
(74) *Attorney, Agent, or Firm* — Cha & Reiter, LLC.

(57) ABSTRACT

A stylus pen for inputting data of an electronic device includes a cavity type cylinder housing, a head, a moving body, and at least one grip. The cavity type cylinder housing has a tip for engaging with a touch screen at one end and the head is retractably installed at the other end of the cylinder housing. A moving body disposed within the cylinder housing and coupled to the head slidably moves depending on a retraction operation of the head. At least one grip is installed such that a portion of the grip is protudes outwardly from the cylinder housing depending on a movement direction of the moving body.

17 Claims, 10 Drawing Sheets

STYLUS PEN AND ELECTRONIC DEVICE HAVING THE SAME

CLAIM OF PRIORITY

This application claims the benefit under 35 U.S.C. §119 (a) of a Korean patent application filed in the Korean Intellectual Property Office on Aug. 2, 2012 and assigned Serial No. 10-2012-0084867, the entire disclosure of which is hereby incorporated by reference.

BACKGROUND

1. Field of the Invention

The present disclosure relates to a stylus pen used in an electronic device having a touchscreen.

2. Description of the Related Art

Today's remarkable development in various electronic communication technologies portable terminals lead to lighter and smaller portable terminals, which includes a mobile phone such as a smart phone, a mobile pad, a media player, a tablet computer, a handheld computer, a Personal Digital Assistant (PDA), etc.

Further, a number of peripheral devices related to the electronic device has increased. Typical peripheral devices may be roughly classified into an auxiliary memory card, an ear microphone mounted to the electronic device and installed to allow communication with a counterpart, a Bluetooth headset for performing short distance wireless communication via a Bluetooth module installed in the electronic device, a stylus pen for easily manipulating a touchscreen unit allowing input and output simultaneously, etc.

A smart phone is implemented with a touch screen for performing input and output simultaneously. A touch panel used for the touchscreen unit is classified into various touch panels such as a resistive touch panel, a capacitive touch panel, an ultrasonic touch panel, a light (infrared) sensor type touch panel, an electromagnetic touch panel, a sound wave touch panel, etc.

To increase convenience and diversity of a touch input, some electronic devices are equipped with a stylus pen of a predetermined length whose end is sharp so that the stylus pen is attachable/detachable to/from the inside of the electronic device. For example, the electronic device having the resistive touchscreen enables a user to use the sharp end of the stylus pen a predetermined pressure to activate the touch screen. In case of the capacitive touch panel, it is preferable that a tip of the stylus pen contacting a touchscreen is formed of a conductive material. Also, in case of the electromagnetic touch panel, the electronic device may be configured such that a coil and a magnetic body are provided inside a stylus pen to generate a resonance frequency depending on electromagnetic induction, and a separate digitizer inside the electronic device reads a relevant position of the stylus pen. As the electronic devices are getting smaller, the stylus pen integrated in these devices is also getting smaller.

As described above, various sizes and types of stylus pens having a similar shape are used to be attachable/detachable to/from the electronic device. However, a stylus pen whose size (length and diameter) is smaller is not easy for a user to grip and use.

SUMMARY

An aspect of the present invention is to address at least the above-mentioned problems and/or disadvantages and to provide at least the advantages described below. Accordingly, an aspect of the present invention is to provide a stylus pen configured such that it is easily gripped even when its size for being mounted to an electronic device reduces, and an electronic device having the same.

Another aspect of the present invention is to provide a stylus pen configured such that it is easily gripped by extending a grip with only an operation of drawing a head, and an electronic device having the same.

Still another aspect of the present invention is to provide a stylus pen configured such that extension of a length and a grip is naturally induced with only an operation of drawing the stylus pen from an electronic device, and an electronic device having the same.

In accordance with an aspect of the present invention, a stylus pen for inputting data of an electronic device includes: a cylinder housing having at least one grip receiving hole at one end; a moving body slidably disposed within the cylinder housing; a head coupled to the moving body via an opening at the one end of the cylinder housing; and at least one grip disposed within the cylinder housing and selectively protruding outwardly through the at least one grip receiving hole depending on a movement of the head and the moving body.

The moving body includes a body of a predetermined length fixed with the head, a connection stand extending from the body up to the grip portion, and at least one support piece protruding from the connection stand and formed to have an area wider than the connection stand, wherein at least one protruding contact protrusion is formed on an inner side of the grip to protrude the grip in such a way that the support piece selectively pressurizes the contact protrusion via a contact depending on movement of the moving body.

The stylus pen further includes an interrupt means for preventing the grip from being arbitrarily protruded to an outside from a position maximally inserted into the cylinder housing. The interrupt means includes an elastic unit including a body fixed inside the grip and a plate spring extending from the body by a predetermined length, and a cam formed on the connection stand of the moving body and having a through hole for receiving the plate spring to selectively support the plate spring of the elastic unit depending on movement of the moving body.

In accordance with another aspect of the present invention, an electronic device in which the stylus pen having the above-described construction so that it is detachable from a mount hole disposed in a main body is installed is provided. A hooking protrusion protrudes from an inner side of the stylus pen mount hole, and a hooking recess is formed along an outer periphery of a tip of the stylus pen to allow the stylus pen to be temporarily hooked or stopped when the stylus pen is attached/detached to/from the mount hole, and allow force by which the hooking protrusion is hooked at the hooking recess to be stronger than force drawing the head from the cylinder housing, so that the grip is protruded/inserted from/to the cylinder housing by drawing the head before completely drawing the stylus pen from the mount hole.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Although the present invention illustrates and describes an electronic device with various sensing touchscreen types having a stylus pen for communication, it is not limited thereto. The electronic devices to which a stylus pen according to the present invention is applied may include various electronic devices having a touchscreen unit such as a smart phone for communication, a mobile pad, a media player, a tablet computer, a handheld computer, any duplex systems, a Personal Digital Assistant (PDA), etc.

Figure 1:
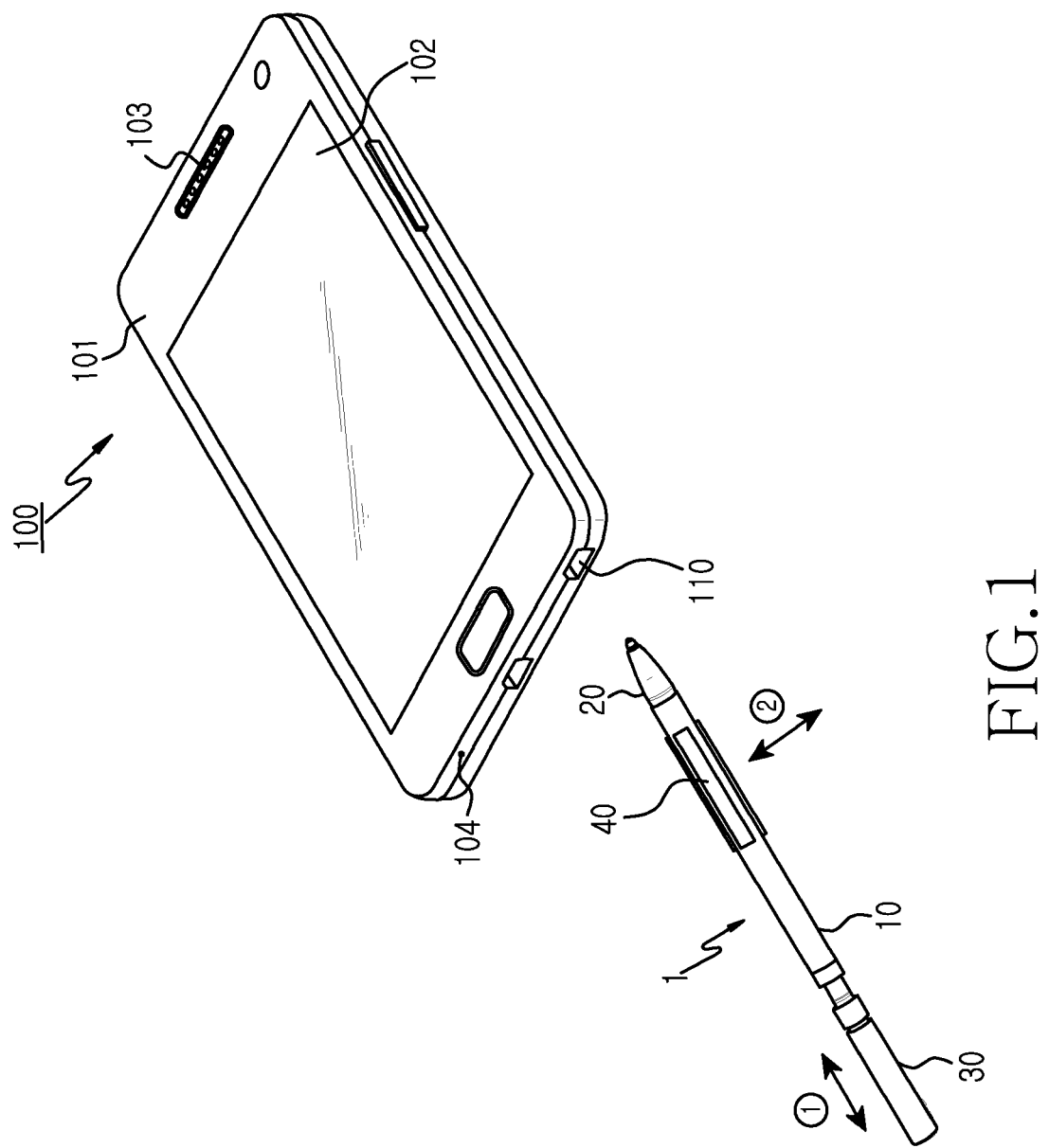
FIG. 1 is a perspective view illustrating a stylus pen applied to an electronic device according to an exemplary embodiment of the present invention.

FIG. 1 is a perspective view illustrating a stylus pen applied to an electronic device according to an exemplary embodiment of the present invention.

Referring to FIG. 1, an electronic device 100, and a stylus pen 1 detachably installed to a mount hole 110 formed at the lower end of the electronic device 100 are provided.

A touchscreen unit 102 for performing data input/output on the same region is installed on a front side 101 of the electronic device 100, an ear-piece 103 for communication is installed on the upper portion of the touchscreen unit 102, and a microphone unit 104 for communication is installed on the lower portion of the touchscreen unit 102. Therefore, the illustrated electronic device 100 whereto the teachings of the present invention is applicable may be a mobile terminal such as a smart phone.

The electronic device 100 is provided with a detachable stylus pen 1 to allow a user to more efficiently manipulate the touchscreen unit 102. To achieve this, the stylus pen 1 according to the present invention includes a retractable head 30 installed at one end of a cylindrical cylinder housing 10 having a predetermined length, and a tip 20 at the other end for manipulating the touchscreen. Furthermore, a plurality of grips 40 is installed on a body of the cylindrical cylinder housing 10. The grip 40 is configured to selectively protrude outwardly from the body of the cylinder housing 10 by a retraction operation of the head 30.

That is, as illustrated in FIG. 1, when the head 30 of the stylus pen 1 moves in a direction ① which is a lengthwise direction, the grip 40 installed on the body of the cylinder housing 10 may protrude out outwardly in a direction ②, which is a direction perpendicular to the lengthwise direction.

More preferably, when the stylus pen 1 is detached from the mount hole of the electronic device 100 initially, the tip of the stylus pen is temporally stopped from being completely released from the mount hole. The head 30 is pulled out from the cylinder housing 10 and temporally stopped, the grip 40 disposed within the body of the cylinder housing 10 may be protruded outwardly (or inserted back within the cylinder housing). Thereafter, the user can pull out the stylus pen 1 completely from the mount hole. This configuration provides convenience of reducing a two-step operation of allowing the user to separate the stylus pen 1 from the electronic device 100 while providing a grip surface on the pen for a better grip. Preferably, a material having frictional force may be used for the grip 40 so that gripping by the user is easy. For example, the grip may be formed in such a way that rubber or silicon material is coated on a grip of a synthetic resin. Also, the grip 40 may be formed of rubber or silicon.

Figure 2:
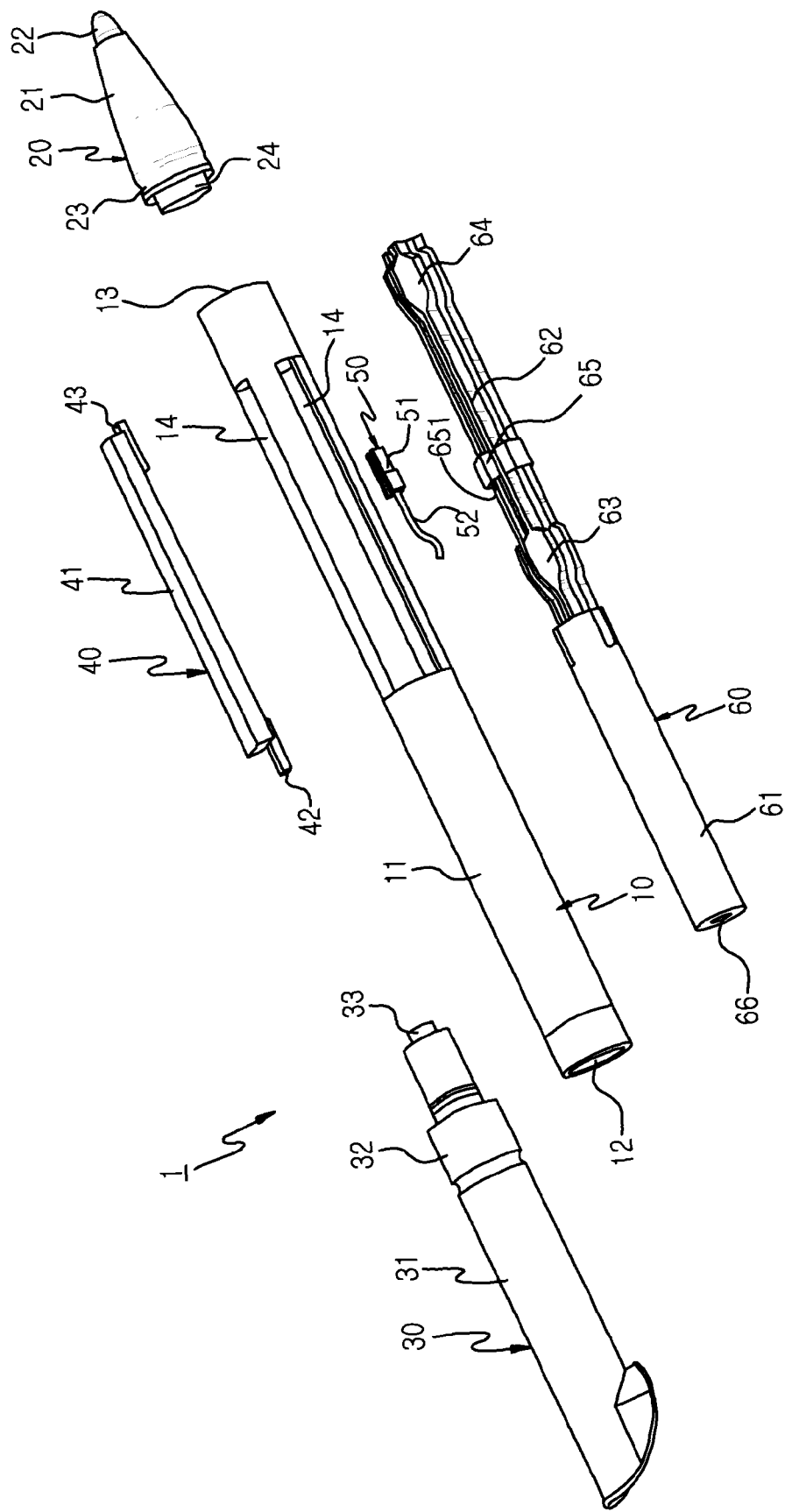
FIG. 2 is an exploded perspective view illustrating the stylus pen of FIG. 1 according to an exemplary embodiment of the present invention.

FIG. 2 is an exploded perspective view illustrating the stylus pen 1 of FIG. 1 according to an exemplary embodiment of the present invention.

Referring to FIG. 2, the stylus pen 1 includes a cavity type cylindrical cylinder housing 10 having a predetermined length, a head 30 retractably installed at one end of the cylinder housing 10, a tip 20 installed at the other end of the cylinder housing 10 to contact a touchscreen, a moving body 60 installed inside the cylinder housing 10 to move in a lengthwise direction together with the head 30, a grip 40 installed to protrude via a plurality of grip receiving holes 14 formed in the cylinder housing 10 to selectively protrude outwardly depending on movement of the moving body 60, and an elastic unit 50 installed to the grip 40 to selectively interfere with the release of the grip outwardly depending on a movement of the moving body 60.

A first insert hole 12 is formed at one end of the cylinder housing 10, and a second insert hole 13 is formed at the other end. Also, the grip receiving holes 14 are formed lengthwise in the cylinder housing 10 with a predetermined interval along the circumferential direction. Preferably, according to the present invention, the grip receiving holes 14 may be installed in three locations with an interval of 120 degrees from each other so accommodate three grips 40, respectively. However, it should be noted that one, two, or four or more grips may be provided within the moving body 60.

The head 30 includes a cylindrical body 31 of a predetermined length, a shaft portion 32 extending from the body 31 and having a diameter smaller than the body 31, and a coupling portion 33 extending from the shaft portion 32 and having a diameter smaller than the shaft portion 32. The shaft portion 32 may provide a predetermined retraction distance without being completely detached from the cylinder housing 10.

The tip 20 includes a contact end 22 that tapers from the cylindrical body 20 to one end, and the other end of the tip 20 is formed as a coupling portion 24 for being fixed in the second insert hole 13 of the cylinder housing 10. Therefore, the contact end 22 will be used as a contact portion with which a user touches the touchscreen unit. Also, a hooking recess 23 that may be temporarily stopped by a hooking protrusion 111 formed inside a terminal mount hole 110.

The moving body 60 is formed to have a length and a diameter such that it is inserted into the cavity portion of the cylinder housing 10 and may swiftly perform a reciprocating motion therein. A body 61 of a predetermined length to which the head 30 is fixed is formed on one end of the moving body 60. A connection stand 62 of a predetermined length is formed on the other end of the body 61. A first support piece 63 and a second support piece 64 are formed on the connection stand 62 with a predetermined interval. The first support piece 63 and the second support piece 64 protrude with an area wider than the connection stand 62, and both ends of them may be formed to have an inclination. The connection stand 62 having one pair of support pieces 63 and 64 may be formed as many as the number of applied grips 42. Furthermore, a cam 65 may be formed between the first support piece 63 and the second support piece 64 to control the movement of the grip 40 as it engages with a plate spring 52 of an elastic unit 50. Therefore, the cam 65 may be formed to have a through hole 651 that can selectively receive the plate spring 52 of a predetermined length.

The grip 40 includes a body 41 and hooking pieces 42 and 43. The body has a predetermined size and protrudes to an external direction via the grip receiving hole 14 of the cylinder housing 10. The hooking pieces 42 and 43 extend from both ends of the body 41 and are hooked at the inner side of the cavity of the cylinder housing 10 to prevent the grip 40 from being completely detached from the cylinder housing 10. Also, a first contact protrusion 44 of FIG. 3A and a second contact protrusion 45 of FIG. 3A protrude on the inner side of the grip 40. These contact protrusions 44 and 45 contact and act on the first support piece 63 and the second support piece 64, respectively, while the moving body 60 moves inside the cylinder housing 10.

The grip 40 may be formed of a synthetic resin, and may be formed of rubber or silicon for providing high frictional force when a user grips the grip. Also, the grip 40 may be formed by coating a surface of a synthetic resin with a material having high frictional force such as rubber and silicon.

The elastic unit 50 includes a body 51 fixed inside the grip 40 and a plate spring 52 fixed in the body 51 and extending in the lengthwise direction of the cylinder housing 10 by a predetermined length. The plate spring 52 is installed such that it is interrupted by the cam 65 provided to the moving body 60 depending on the movement of the moving body 60. Therefore, the cam 65 serves to control the movement of the grip 40 outwardly. Preferably, the cam 65 engages with the plate spring 52 in order to prevent the grip 40 from moving outwardly when the head 30 is completely drawn/inserted from/to the cylinder housing 10.

The stylus pen 1 having the above configuration provides the grip 40 such that the body 41 is exposed to exterior via the grip receiving hole 14 of the cylinder housing 10. A portion of the grip 40 is exposed via the grip receiving hole 14 but the hooking pieces 42 and 43 prevents a release of the grip 40 to exterior. The body 51 of the elastic unit 50 having the plate spring 52 is fixed inside the grip 40. After the moving body 60 is inserted into the cavity portion of the cylinder housing 10, a coupling portion 33 of the head 30 is fixed in a coupling hole 66 of the moving body 60 via the first insert hole 12 of the cylinder housing 10. Therefore, the moving body 60 will move together in a lengthwise direction according to a retracting motion of the head 30 inside the cylinder housing 10. The elastic unit 50 may be fixed in a known method inside the grip 40. The plate spring 52 of the elastic unit 50 may be disposed in the through hole 651 of the cam 65.

Of course, it is obvious that the tip 20 is fixed in the second insert hole 13 of the cylinder housing 10.

When coupling is completed as described above, the grip 40 will selectively protrude in a radial direction of the cylinder housing 10 by the retracting motion of the head 30. Preferably, an embodiment of the present invention may be configured such that the grip 40 may maintain a protruded state when the head 30 is completely drawn from the cylinder housing 10, and the grip 40 may coincide with an exterior of the cylinder housing 10 or may be placed lower than the exterior when the head 30 is completely inserted into the cylinder housing 10.

Figure 3A:
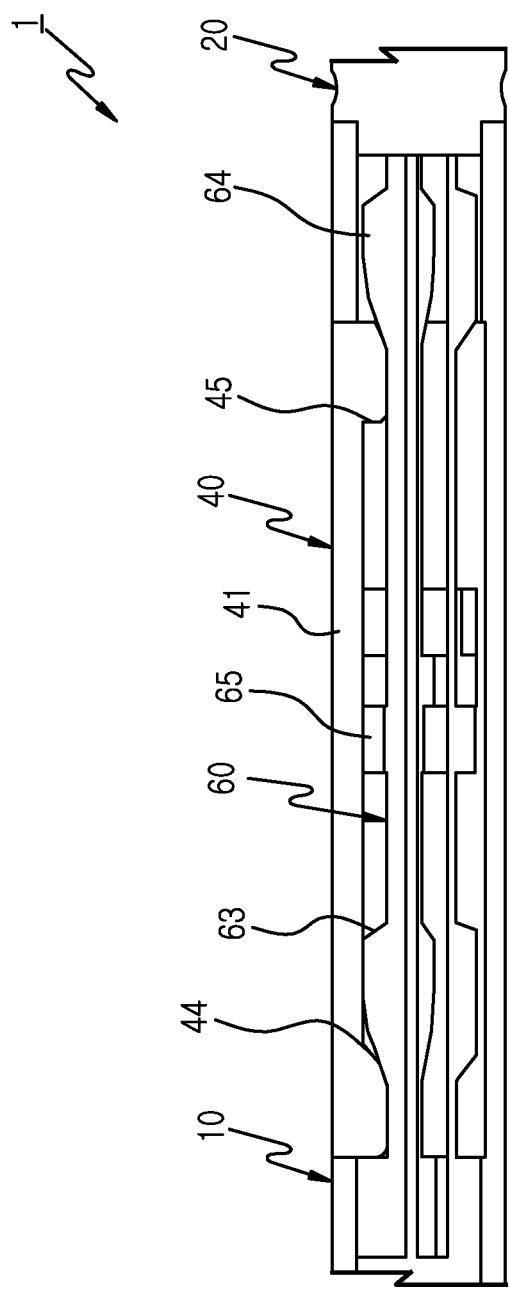
FIG. 3A is a cross-sectional view of a crucial portion illustrating a head of the stylus pen of FIG. 1 completely inserted inside a cylinder housing according to an exemplary embodiment of the present invention.
Figure 3B:
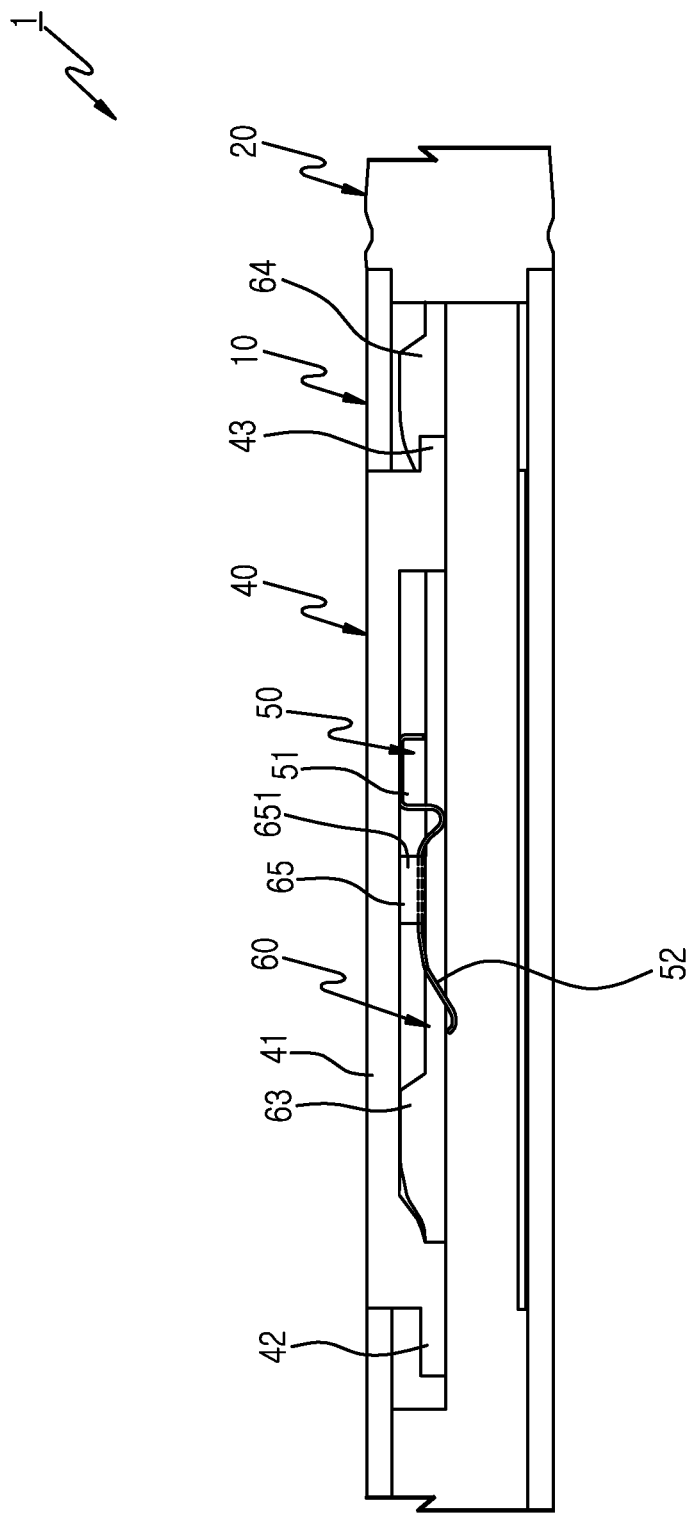
FIG. 3B is a cross-sectional view of a crucial portion illustrating a position of an elastic unit and a cam in a state of FIG. 3A according to an exemplary embodiment of the present invention.

FIG. 3A is a cross-sectional view of a crucial portion illustrating a head 30 of the stylus pen 1 of FIG. 1 completely inserted inside a cylinder housing 10 according to an exemplary embodiment of the present invention, and FIG. 3B is a cross-sectional view of a crucial portion illustrating a position of an elastic unit 50 and a cam 65 in a state of FIG. 3A according to an exemplary embodiment of the present invention.

As illustrated in FIG. 3A, while the head 30 is completely inserted into the cylinder housing 10, the first support piece 63 and the second support piece 64 of the moving body 30 do not interfere with the first contact protrusion 44 and the second contact protrusion 45 of the grip 40. Therefore, the grip 40 may maintain a state coinciding with the exterior of the cylinder housing 10, meaning that the grip is maintained inside the housing 10.

At this point, as illustrated in FIG. 3B, the plate spring 52 of the elastic unit 50 fixed in the grip 40 is interrupted by the cam 65 formed on the moving body 60 to interrupt the movement of the grip 40 to the outside of the cylinder housing 10. The cam 65 may include a through hole 651 for selectively receiving the plate spring therein. The plate spring is received in the through hole 651, so that movement of the grip 40 is selectively interrupted consequently.

Figure 4A:
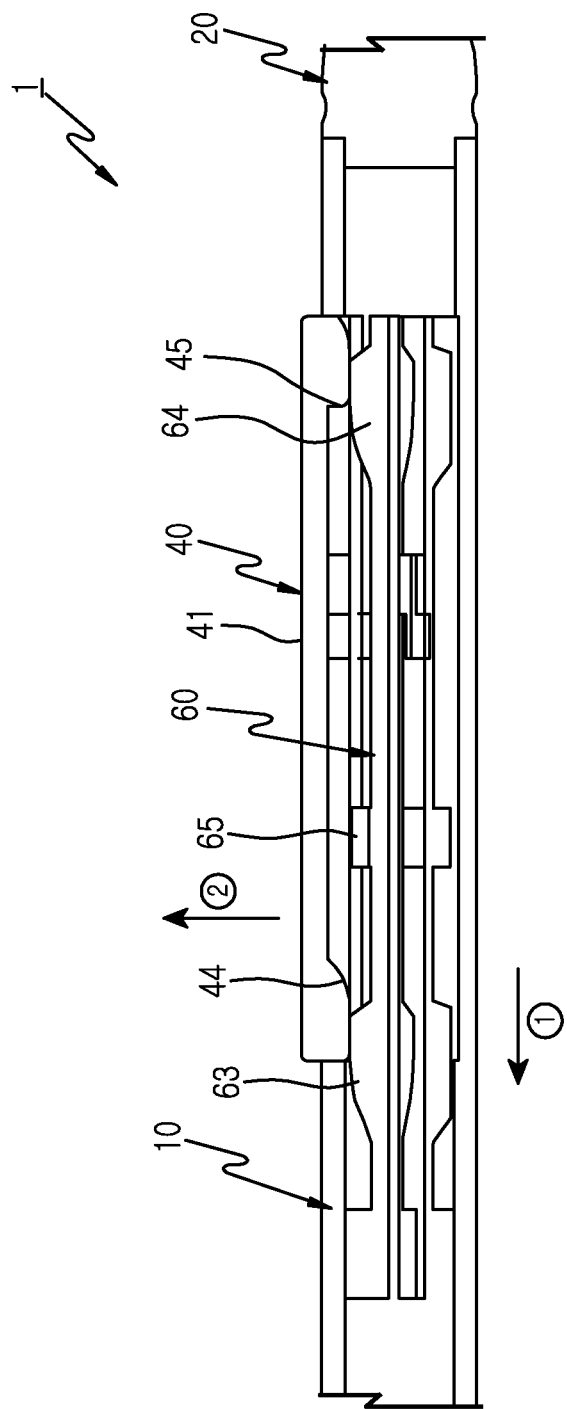
FIG. 4A is a cross-sectional view of a crucial portion illustrating a head of the stylus pen of FIG. 1 completely drawn from a cylinder housing according to an exemplary embodiment of the present invention.
Figure 4B:
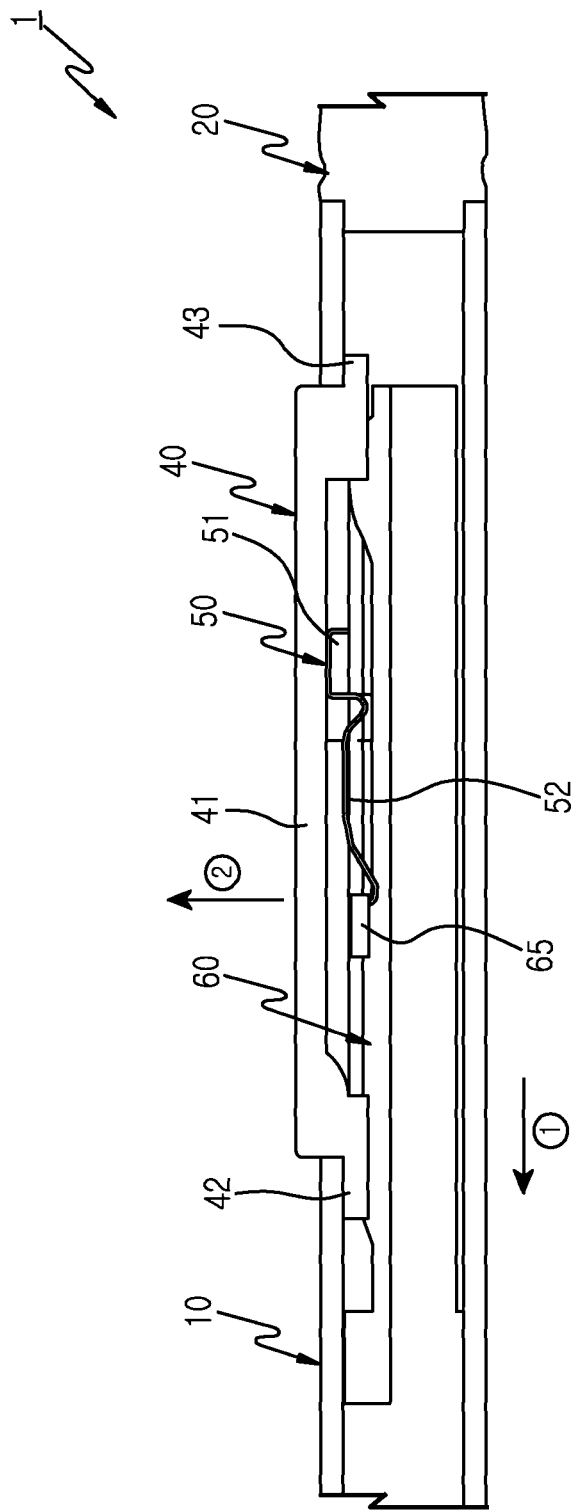
FIG. 4B is a cross-sectional view of a crucial portion illustrating a position of an elastic unit and a cam in a state of FIG. 4A according to an exemplary embodiment of the present invention.

FIG. 4A is a cross-sectional view of a crucial portion illustrating a head 30 of the stylus pen 1 of FIG. 1 completely drawn from a cylinder housing 10 according to an exemplary embodiment of the present invention, and FIG. 4B is a cross-sectional view of a crucial portion illustrating a position of an elastic unit 50 and a cam 65 in a state of FIG. 4A according to an exemplary embodiment of the present invention.

As illustrated in FIG. 4A, in the case where the head 30 is drawn from the cylinder housing 10, the moving body 60 also moves. At this point, the first and second support pieces 63 and 64 of the moving body 60 engage and push the first and second contact protrusions 44 and 45 of the grip 40 to the outside. Therefore, the grip 40 is pushed to the outside by the first and second support pieces 63 and 64. While the head 30 is completely drawn from the cylinder housing 10, the first and second support pieces 63 and 64 of the moving body 60 support the first and second contact protrusions 44 and 45 of the grip 40, so that the grip 40 is maintained within the cylinder housing 10.

At this point, as illustrated in FIG. 4B, the cam 65 of the moving body 60 forces the grip 40 to swiftly protrude to the outside by releasing interruption of the plate spring 52 installed to the grip 40.

Meanwhile, in the case where the head 30 is inserted into the cylinder housing 10, the first and second support pieces 63 and 64 of the moving body 60 disengage the first and second contact protrusions 44 and 45, and simultaneously the cam 65 of the moving body 60 engages the plate spring 52 of the grip 40 to prevent the plate spring 52 to push the grip outwardly, and consequently guides the grip 40 to the inner direction of the cylinder housing 10.

Figure 5:
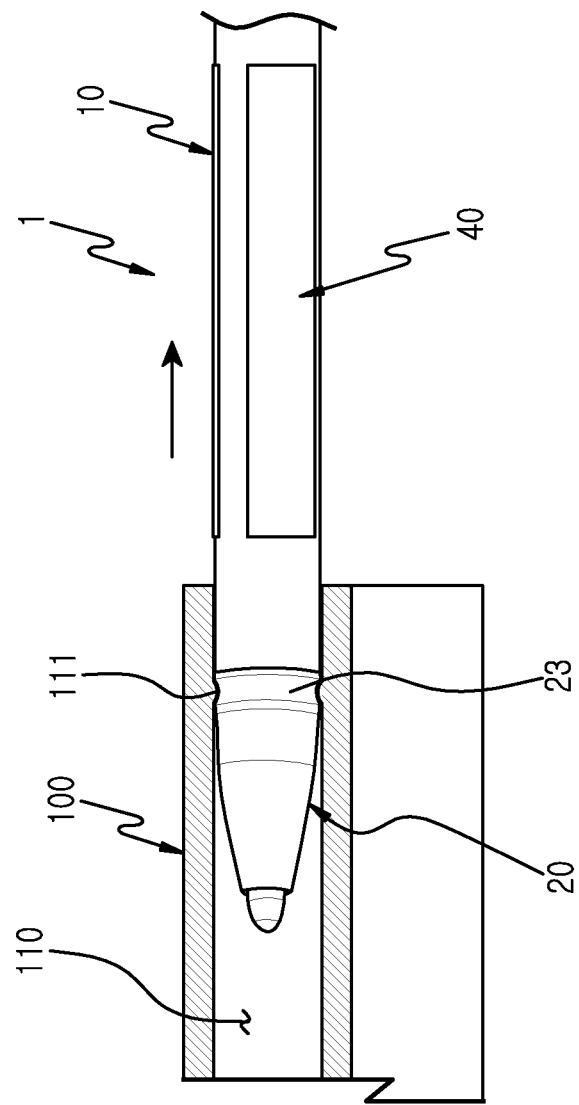
FIG. 5 is a cross-sectional view of a crucial portion illustrating that a stylus pen is drawn from a mount hole of an electronic device according to an exemplary embodiment of the present invention.

FIG. 5 is a cross-sectional view of a crucial portion illustrating that a stylus pen 1 is drawn from a mount hole 110 of an electronic device 100 according to an exemplary embodiment of the present invention. A hooking protrusion 111 is formed inside the mount hole 110 of the electronic device 100. This hooking protrusion 111 has a structure hooked at a hooking recess 23 formed at the tip 20 of the stylus pen 1. Therefore, when the stylus pen 1 is detached from the mount hole 110 of the electronic device 100 by some degree initially, the stylus pen 1 is hooked or temporally stopped before completely being released or detached. This hooking operation or temporary stopping of the pen allows the head 30 to protrude from the cylinder housing 10, so that the grip 40 installed to the body 11 of the cylinder housing 10 may protrude when the head 30 is pulled out or inserted back in when the head 30 pushed into the opening.

Thereafter, when a user pulls out the stylus pen 1 completely with an additional force, the stylus pen 1 is swiftly detached. This configuration provides convenience of reducing a two-step operation that allows a user to separate the stylus pen 1 from the electronic device initially while providing the grip surfaces by pulling out the head 30 when the stylus pen is temporally stopped.

Figure 6:
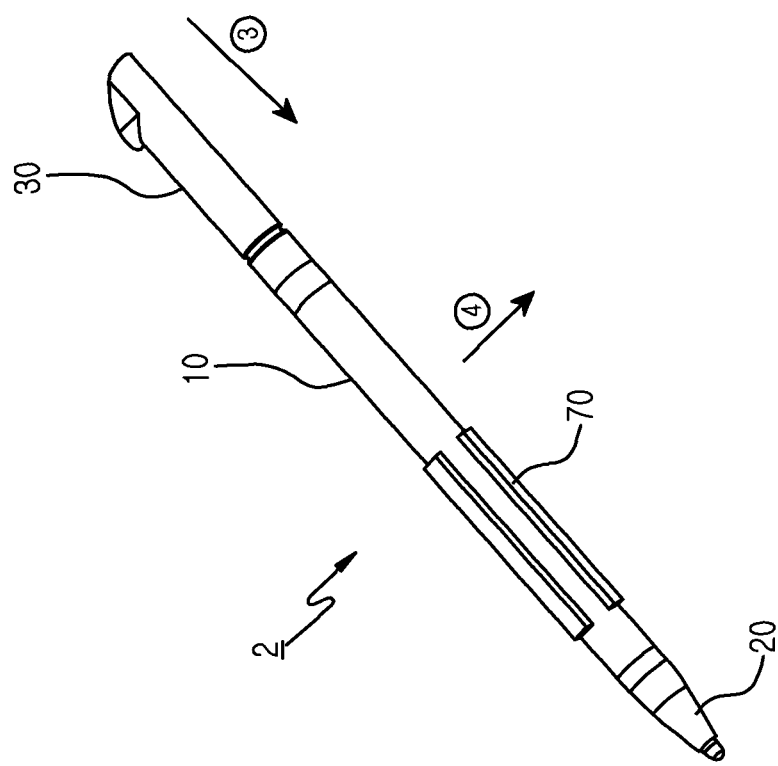
FIG. 6 is a perspective view illustrating a stylus pen according to another exemplary embodiment of the present invention.

FIG. 6 is a perspective view illustrating a stylus pen 2 according to another exemplary embodiment of the present invention.

As illustrated in FIG. 6, the stylus pen 2 may be configured so that a grip 70 protrudes outwardly when the head 30 completely inserted into the cylinder housing 10. In this case, a user may insert the head 30 in a direction ③ of FIG. 6, so that the grip 70 protrudes in a direction ④ which is a diameter direction of the cylinder housing 10. Note that the operation shown in FIGS. 6 and 7 are in a reverse order with reference to FIGS. 4 and 5.

Figure 7A:
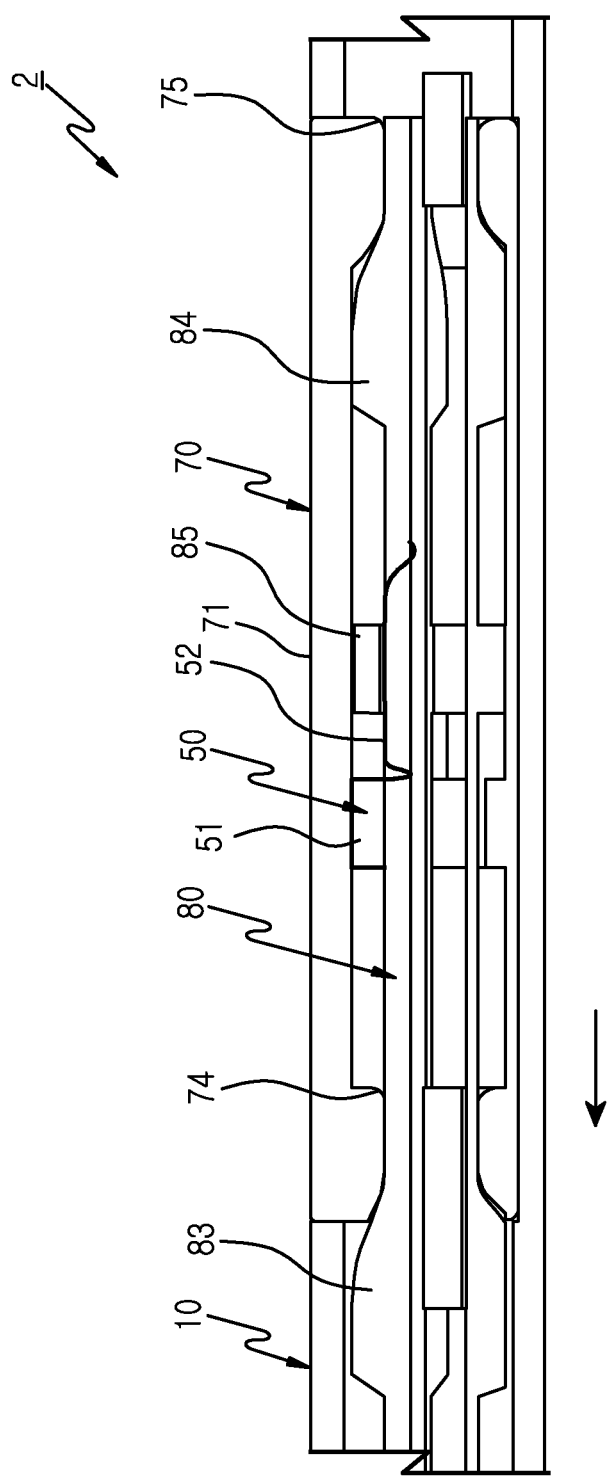
FIG. 7A is a cross-sectional view of a crucial portion illustrating a head of the stylus pen of FIG. 6 drawn from a cylinder housing according to another exemplary embodiment of the present invention.
Figure 7B:
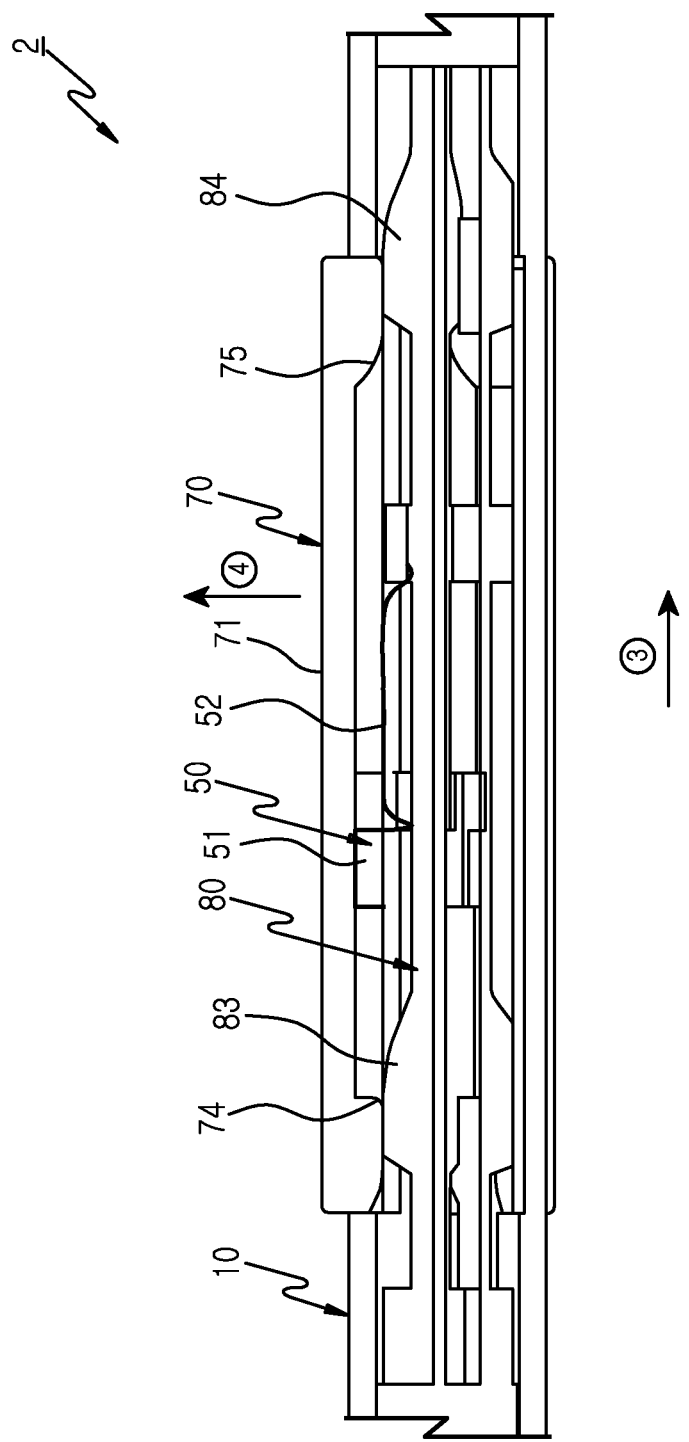
FIG. 7B is a cross-sectional view of a crucial portion illustrating a head of the stylus pen of FIG. 6 inserted into a cylinder housing according to another exemplary embodiment of the present invention.

FIG. 7A is a cross-sectional view of a crucial portion illustrating a head 30 of the stylus pen 2 of FIG. 6 drawn from a cylinder housing 10 according to an exemplary embodiment of the present invention, and FIG. 7B is a cross-sectional view of a crucial portion illustrating a head 30 of the stylus pen 2 of FIG. 6 inserted into a cylinder housing 10 according to an exemplary embodiment of the present invention.

As illustrated in FIGS. 7A and 7B, a stylus pen includes all configuration of the stylus pen according to the previous embodiment and same reference numerals are given to the same elements. However, positions of a first support piece 83 and a second support piece 84 of a moving body 80 have changed, and an installation direction of the plate spring 52 of the elastic unit 50 has changed.

That is, as illustrated in FIG. 7A, when the head 30 is drawn from the cylinder housing 10, the moving body 80 also moves together. At this point, the first and second support pieces 83 and 84 of the moving body 80 maintain a state under which the first and second support pieces 83 and 84 do not interfere with a first contact protrusion 74 and a second contact protrusion 75 of the grip 70. In this case, since the plate spring 52 fixed on the body 51 of the elastic unit 50 is interrupted or engaged by a cam 85 of the moving body 80, the position of the grip 70 may be prevented from protruding outwardly.

In contrast, as illustrated in FIG. 7B, in the case where the head 30 is inserted into the cylinder housing 10, the moving body 80 also moves together. At this point, the first and second support pieces 83 and 84 of the moving body 80 push the first and second contact protrusions 74 and 75 of the grip 70 to the outside. Therefore, the grip 70 is pushed outwardly by the first and second support pieces 83 and 84. While the head 30 is completely drawn from the cylinder housing 10, the first and second support pieces 83 and 84 of the moving body 80 support the first and second contact protrusions 74 and 75 of the grip 70, so that the grip 70 consistently maintains a state where the grip 70 protrudes from the cylinder housing 10.

At this point, the cam 85 of the moving body 80 prepares a state where the grip 70 swiftly protrudes outwardly by releasing interruption of the plate spring 52 installed to the grip 70.

The stylus pen according to the present invention provides convenience in using it because a grip portion extends simultaneously when being released from the terminal, and the grip provides an easier use even when a size or length of the stylus pen is reduced.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A stylus pen for inputting data of an electronic device, comprising:
    a cylinder housing having at least one grip receiving opening;
    a moving body slidably disposed within the cylinder housing;
    a head coupled to the moving body via an opening at the one end of the cylinder housing;
    at least one grip disposed within the cylinder housing and selectively protruding outwardly through the at least one grip receiving opening depending on a movement of the head and the moving body; and
    an interrupt means for preventing the at least one grip from protruding outwardly, wherein the interrupt means comprises:
    an elastic unit having a body coupled to the at least one grip and a plate spring extending from the body; and a cam formed on the moving body and having an opening for receiving the plate spring depending on a movement of the moving body.

2. The stylus pen of claim 1, wherein the cylinder housing is formed such that the at least one grip receiving opening is formed in a lengthwise direction of the cylinder housing.

3. The stylus pen of claim 1, wherein hooking pieces are formed at both ends of the at least one grip, respectively, for preventing the at least one grip from being completely released from the at least one grip receiving hole of the cylinder housing.

4. The stylus pen of claim 1, wherein the at least one grip is formed of at least one of rubber and silicon.

5. The stylus pen of claim 1, wherein the at least one grip is formed of metal or a synthetic resin, and an exterior of the at least one grip is coated with rubber or silicon.

6. The stylus pen of claim 1, wherein the moving body comprises:
   a connection stand extending from one end of the moving body; and
   at least one support piece extending from the connection stand for engaging with the at least one grip,
   wherein the at least one support piece pushes the at least one grip outwardly as the moving body slidably moves within the cylinder housing.

7. The stylus pen of claim 1, wherein when the head is pulled away from the cylinder housing, the at least one grip protrudes outwardly from an exterior of the cylinder housing.

8. The stylus pen of claim 1, wherein when the head is pushed towards the cylinder housing, the at least one grip protrudes outwardly from an exterior of the cylinder housing.

9. The stylus pen of claim 1, wherein when the at least one grip is disposed within the cylinder housing, an exterior of the at least one grip coincides with an exterior of the cylinder housing or is disposed at a position lower position than an exterior of the cylinder housing.

10. The stylus pen of claim 1, wherein when the at least one grip is inserted into the cylinder housing maximally, the cam supports the plate spring, and when the grip protrudes from the cylinder housing maximally, the cam releases the plate spring.

11. The stylus pen of claim 1, wherein the stylus pen is selectively mounted inside a mount opening of the electronic device.

12. The stylus pen of claim 11, wherein a hooking protrusion is provided circumferentially in an inner side of the mount opening, and a hooking recess formed along an outer peripheral surface of a tip of the stylus pen to engage with the hooking protrusion temporarily stop the stylus pen when being released from the mount opening.

13. The stylus pen of claim 12, wherein an engaging force between the hooking protrusion and the hooking recess is substantially stronger than a force for drawing the head from the cylinder housing so that the head is pulled out before the stylus pen is completely released from the mount opening.

14. The stylus pen of claim 1, wherein the electronic device comprises a portable wireless terminal.

15. An electronic device comprising a stylus pen configured to be detachable from a mount opening of the electronic device, wherein the stylus pen further includes:
   a cylinder housing having at least one grip receiving opening at one end;
   a moving body slidably disposed within the cylinder housing;
   a head coupled to the moving body via an opening at the one end of the cylinder housing;
   at least one grip disposed within the cylinder housing and selectively protruding outwardly through the at least one grip receiving opening depending on a movement of the head and the moving body; and
   an interrupt means for preventing the at least one grip from protruding outwardly, wherein the interrupt means comprises:
   an elastic unit having a body coupled to the at least one grip and a plate spring extending from the body; and
   a cam formed on the moving body and having an opening for receiving the plate spring depending on a movement of the moving body.

16. The electronic device of claim 15, wherein the moving body comprises:
   a connection stand extending from one end of the moving body; and
   at least one support piece extending from the connection stand for engaging with the at least one grip,
   wherein the at least one support piece pushes the at least one grip outwardly as the moving body slidably moves within the cylinder housing.

17. The stylus pen of claim 15, wherein a hooking protrusion is provided circumferentially in an inner side of the mount opening, and a hooking recess formed along an outer peripheral surface of a tip of the stylus pen to engage with the hooking protrusion temporarily stop the stylus pen when being released from the mount opening,
   wherein an engaging force between the hooking protrusion and the hooking recess is substantially stronger than a force for drawing the head from the cylinder housing so that the head is pulled out before the stylus pen is completely released from the mount opening.

* * * * *